United States Patent

[11] 3,573,663

[72] Inventors Henry Martin Huge
Bay Village;
Benny K. Barnes, Lorain, Ohio
[21] Appl. No. 804,350
[22] Filed Feb. 10, 1969
[45] Patented Apr. 6, 1971
[73] Assignee Lorain Products Corporation

[54] FREQUENCY CONTROL CIRCUIT
11 Claims, 4 Drawing Figs.

[52] U.S. Cl. .......... 331/117, 179/84A, 179/84T, 325/465, 331/47, 331/179, 334/55
[51] Int. Cl. .......... H03b 5/12
[50] Field of Search .......... 331/179, 47, 161, 117; 179/84 (A), 84 (T), 27.3; 334/55, 56; 325/465

[56] References Cited
UNITED STATES PATENTS

| | | | |
|---|---|---|---|
| 3,155,922 | 11/1964 | Hackett | 331/179 |
| 3,156,883 | 11/1964 | Wells | 331/179 |
| 3,264,566 | 8/1966 | Kaufman et al. | 334/56 |
| 3,295,070 | 12/1966 | Tewksbury et al. | 331/179 |
| 3,427,569 | 2/1969 | Abramson | 334/56 |

*Primary Examiner*—John Kominski
*Attorney*—John Howard Smith

ABSTRACT: A device for producing a predetermined periodicity of discrete, different signals at an output. A pulse generating means produces a recurrent pulse pattern to operate a translating means which converts the pulse pattern to a recurrent sequence of timing pulses. The timing pulses in turn operate timing responsive means to successively energize each of a plurality of frequency determining circuits thereby establishing a multiplicity of different discrete, constant amplitude frequencies delivered sequentially in accordance with the periodicity of the timing pulses and the sequential operation of the timing responsive means.

INVENTORS
HENRY M. HUGE
BENNY K. BARNES
BY John Howard Smith

INVENTORS
HENRY M. HUGE
BENNY K. BARNES
BY John Howard Smith

INVENTORS
HENRY M. HUGE
BENNY K. BARNES
BY John Howard Smith

Patented April 6, 1971 3,573,663

4 Sheets-Sheet 4

INVENTORS
HENRY M. HUGE
BENNY K. BARNES

BY John Howard Smith

FREQUENCY CONTROL CIRCUIT

BACKGROUND OF THE INVENTION

The present invention relates to signalling systems, and is directed more particularly to signalling systems adapted for use in telephone networks.

Heretofore in telephone practice the absence of a handset from its cradle for an unduly long period, known as the off-hook condition, required a service call by a repairman to inform the subscriber of the inoperative condition of the receiver. More recently, however, it has been the practice to eliminate the need for such service calls by providing a distinctive, audible signal at the subscriber's receiver from the central office to attract attention of the subscriber to the condition and to prompt him to replace the handset.

Several difficulties have been associated with the use of off-hook signalling devices particularly those emitting a signal which either sweeps a range of amplitude and frequency or which emits a signal comprising a complex admixture of tones. The first of these difficulties is "crosstalk interference" introduction, into an adjacent line through distributed capacitive coupling, of an AC signal which is in another line. Crosstalk interference disturbs those using the adjacent lines because the coupled AC signals are converted to audible sounds by the subscriber's receiver.

Since the amount of capacitive coupling increases with frequency, it is desirable for a signalling device to keep all frequencies produced, either by design or as a result of unintended modulation between the desired frequencies, as low as possible. In signal generators which produce an admixture of two or more frequencies it is difficult to limit the number of unintended high frequency signals. These undesired frequencies are the sidebands produced by the process of modulation whenever the sum of two or more signal currents is passed through a nonlinear circuit element. When a signal is modulated the signal and each of its harmonics produces sideband frequencies with each other signal and its harmonics. Thus, an admixture of signal frequencies is to be avoided.

A second difficulty in the use of such off-hook signalling devices results from the technical development of precise tone dialing. Precise tone dialing is accomplished by various tones generated by push buttons on the subscriber's set, each of the different precise tones corresponding to a particular "dialed" digit. It is apparent that a signalling device which regularly sweeps through a range of frequencies in one line will cause crosstalk interference in adjacent lines which use frequencies within the range of the latter. If the signalling frequencies of the off-hook signal conflict with the dialing tones, misdirected calls can result in adjacent lines. This same interference can result from the use of a signalling device which utilizes an admixture of tones since one or more of the unintended sidebands can coincide with the tones selected for precise tone dialing.

The adjustment of gain presents a third difficulty. If the gain of the signalling device is adjusted so that the portion of the signal having the smallest peak amplitude produces a satisfactory audible signal, then that portion of the signal having the highest peak amplitude is wasted because of the clipping action of the telephone receiver's voltage limiter. If, however, the volume is adjusted to efficiently utilize that portion of the signal having the higher peak amplitude, the portion of the signal having the lowest peak amplitude is substantially inaudible. Signals of this type are produced by signalling devices which utilize an admixture of signal tones, the variations in peak amplitude occurring as a result of the well-known beat phenomenon.

It has been found that the above difficulties can be avoided by the generation of a multiplicity of various, distinct, discrete predetermined tones of uniform peak amplitude which are generated successively in a predetermined sequence to avoid the above mentioned frequency and amplitude sweeping activity and to avoid an admixture of the different tones.

SUMMARY OF THE INVENTION

Accordingly, it is an object of the invention to avoid the foregoing difficulties by providing a signal generator for producing an off-hook signal of distinctive audible character which is made up of discrete, different severally energized tones.

It is another object of the invention to provide a signal generator of the above character having a substantially sinusoidal output of uniform peak amplitude.

It is a further object of the invention to provide a signal generator which produces a series of discrete, precise, various tones between which there is no "quiet" or interrupted period nor is there an overlapping of the discrete frequencies adjacent one another in the time sequence of the signal pattern.

It is a still further object of the invention to provide a signalling system of the above character which has a high degree of flexibility in that both the order and the relative durations of the discrete, precise tones in the sequence may be easily changed to provide various output signals for other uses than the off-hook signal.

The tones generated in accordance with the present invention avoid modulation and thus the generation of undesirable sideband frequencies by means of the discreteness of the different tones as generated by the present invention.

It is still another object of the invention to provide a novel signal generator having a sequential switching network including pulse generating means and timing translating means which establishes the periodicity of discrete tones upon the application of a voltage across the input terminals.

More specifically it is an object of the invention to provide a signalling system of the above character comprising pulse generating means, timing translating means, timing responsive means and multifrequency generating means so arranged that the various frequencies occur discretely, in the same predetermined sequence and for the same predetermined duration to provide a uniform, uninterrupted tone pattern of predetermined frequency sequence regardless of which of the various frequencies is first energized and in which pattern there is no overlapping of the "on" time of the various frequencies.

Other objects and advantages of my invention will become apparent from the following description and the accompanying drawings in which;

DESCRIPTION OF THE DRAWINGS

FIGS. 2 and 4 comprise schematic diagrams of connected sections of another circuit embodying the invention.

DESCRIPTION OF THE INVENTION

Figure 1:
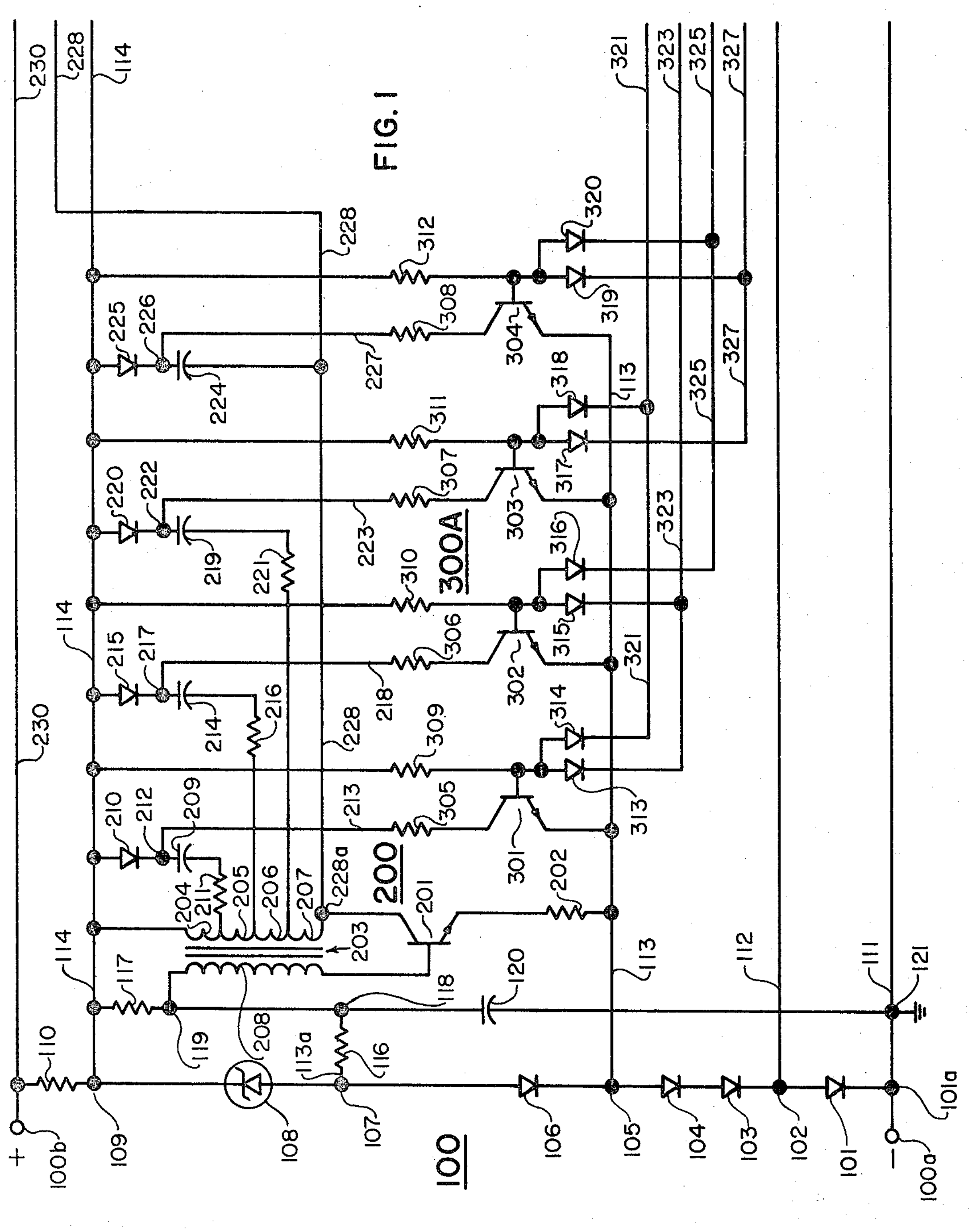
FIGS. 1 and 2 comprise schematic diagrams of connected sections of one circuit embodying the invention.
Figure 2:
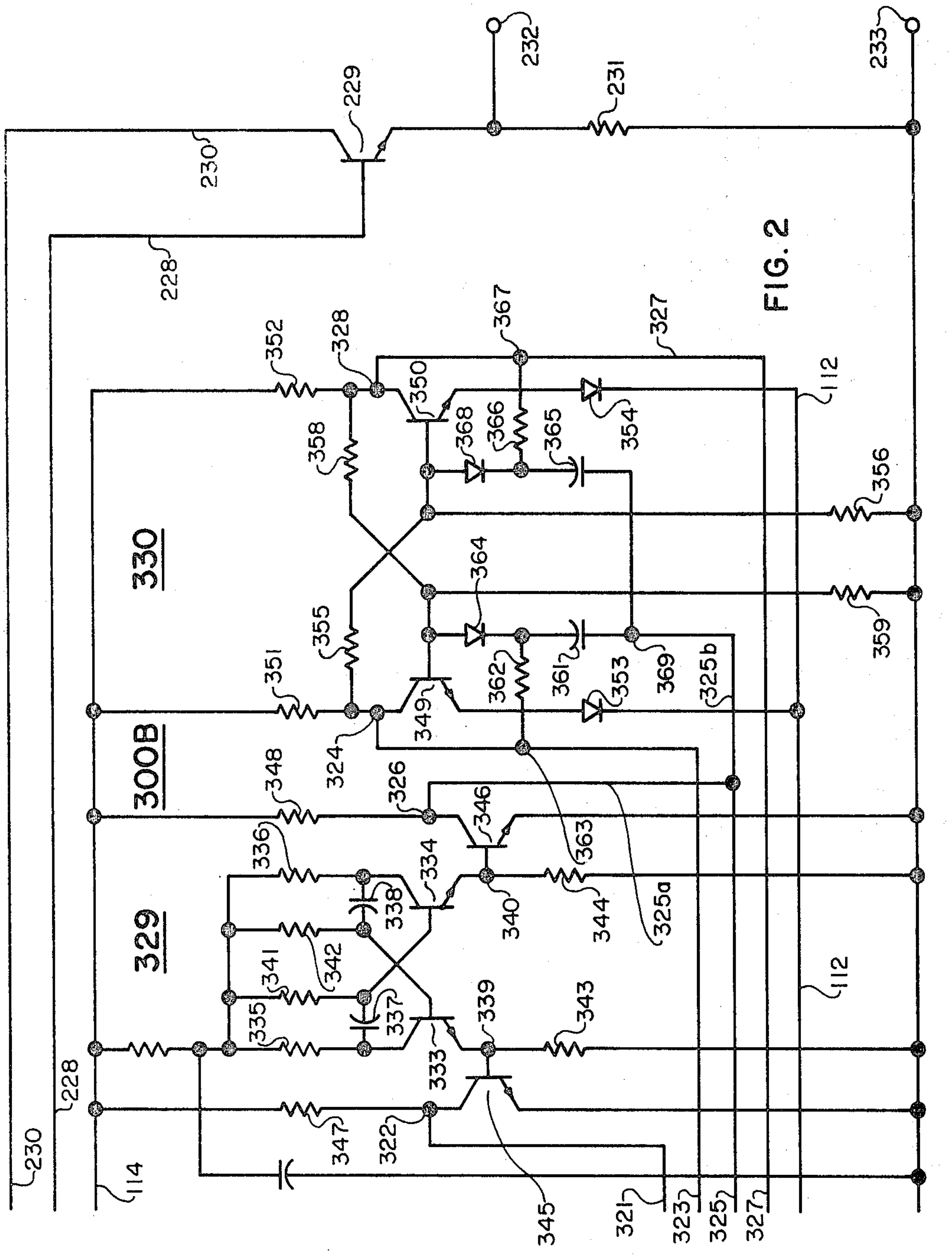

Referring to FIGS. 1 and 2, there is included in the exemplary frequency generator circuit shown herein a power input section 100. Also shown is a multifrequency generating section 200 arranged to generate an output voltage having a recurrent sequence of discrete frequencies in response to timing signals from a sequential switching means including, in the embodiment shown herein, a timing translating section 300A and a pulse generating section 300B.

DC energy is applied to the circuitry of the invention at the DC power terminals **100*a* and 100*b*. In order to suitably proportion the applied DC voltage to provide the circuitry of the invention with the necessary operating voltages, the 113*a* 101, the series connected diodes 103 and 104, a diode 106 and a Zener diode 108 are provided between the respective junction pairs 101*a* and 102; 102 and 105; 105 and 107; and 107 and 109. Each of these diode elements serves to provide a substantially constant potential difference between the junctions to which the leads thereof are respectively connected. The potential difference between junction 101***a* and the remaining input junctions increase in numerical order, and, to transmit these potential differences to appropriate junctions within the circuitry of the invention, the conductors 111, 112, 113, 113*a* and 114 are provided, conductors 111 and 114 serving as ground and positive supply conductors respectively.

A suitable current limiting resistor 110 may be provided to protect the circuitry of the invention while resistors 116 and 117 comprise a voltage divider and apply a portion of the voltage across Zener diode 108 to the junction 119. A second junction 118 between the resistors 116 and 117 is connected to a ground junction 121 through a capacitor 120, this capacitor serving to prevent undesirable voltage fluctuations from appearing between the junctions 118 and 121 to which it is connected.

In order that the above described DC voltages may be used to generate a predetermined sequence of output frequencies in accordance with the invention, the multifrequency generating section 200 is provided. In the present embodiment the latter section includes a tuned-collector transistor oscillator having a plurality of energizable frequency determining circuits to be discussed more fully presently. It will be understood that other oscillator circuits using LS frequency determining circuits and regenerative feedback can be adapted to practice the invention.

In FIG. 1 a variable conducting means is shown as a transistor 201. To the end that changes in the collector-emitter current of transistor 201 influence the base-emitter current thereof, inductive feedback means herein comprising the transformer 203 is provided. The primary winding 203*a* of transformer 203, herein acting as the exciting winding, is divided into a plurality of winding sections 204, 205, 206 and 207 by suitable taps. The secondary winding 208 of transformer 203 herein acting as a feedback winding, is connected between junction 119 and the base of transistor 201. An emitter resistor 202 is provided to introduce an amount of negative feedback into the circuitry of the oscillator to stabilize the operation thereof.

A first frequency determining circuit includes primary winding section 204, a loss balancing resistor 211, a capacitor 209, a timing responsive means 210, here shown as a diode, and a portion of the conductor 114. The capacitance of the capacitor 209, together with the inductance of the primary winding section 204 fixes the frequency of the first frequency determining circuit. Resistor 211 causes the losses in the first frequency determining circuit to be comparable to the losses present in the remaining frequency determining circuits, presently to be described, thereby resulting in a more nearly similar waveform for the different output frequencies.

The diode 210 serves as a timing element responsive to the collector-emitter current in a transistor 301 and allows an AC component of current to flow in the first frequency determining circuit when rendered conducting with a substantial DC current level through the path including conductor 114, a junction 212, conductor 213, the transistor 301, the operation of which will be more fully described presently, and continuing to ground through conductor 113 and junction 101*a*.

A second frequency determining circuit includes the primary winding sections 204 and 205, a loss balancing resistor 216, a capacitor 214, a timing responsive diode 215 and a portion of the conductor 114 and these elements serve the same function as the corresponding elements in the first frequency determining circuit described above. The second frequency determining circuit fixes, however, a second, distinct, discrete and different frequency when its timing responsive element, diode 215, conducts with a substantial DC current level through the path including conductor 114, diode 215, junction 217, conductor 218, the transistor 302, to ground through conductor 113 and junction 101*a*.

A third frequency determining circuit includes the primary winding sections 204, 205 206, a resistor 221, a capacitor 219 and a timing responsive diode 220, and fixes a discrete frequency distinct from those generated in the first two frequency determining circuits when timing responsive diode 220 conducts with a substantial DC current level through the path including conductor 114, junction 222, conductor 223, transistor 303 and conductor 113 to ground through junction 101*a*. A fourth frequency determining circuit includes the entire primary winding comprising winding sections 204, 205, 206 and 207, a capacitor 224, a diode 225 and a portion of the conductor 114. The latter frequency determining circuit is rendered operative to produce a frequency distinct from those of the first three frequency determining circuits when the timing responsive element, diode 225 conducts through the path including conductor 114, diode 225, junction 226, conductor 227, the transistor 304 and continuing through conductor 113 to ground through junction 101*a*. It will be understood that more or fewer frequency determining circuits may be utilized in practicing the invention.

Any increase in the collector-emitter current of transistor 201 will cause a voltage to be induced across the entire primary winding of transformer 203. Assuming that diode 210 is conducting, the induced voltage also appears across the capacitor 209 rendering the top thereof, as shown in FIG. 1, positive with respect to the bottom thereof. Because of the phasing of the primary winding sections 204, 205, 206 and 207 with respect to the secondary winding 208 of the transformer 203, the voltage on the primary winding will induce a voltage on the secondary winding 208 with a polarity which will increase the base-emitter drive current through transistor 201. The increased base-emitter current, in turn, further increases the collector-emitter current. The foregoing regenerative activity continues as the collector-emitter current of transistor 201 approaches its maximum value.

When this maximum occurs, there would normally follow a cutoff in the feedback voltage induced on the secondary winding 208. Because of the resonant nature of the tank circuit comprising the first frequency determining circuit, however, the exciting voltage across primary winding section 204 does not fall to zero. Instead, for a time determined by the capacitance of capacitor 209 and the inductance of the primary winding section 204, the feedback signal to transistor 201 is maintained and the latter transistor allowed to conduct at a decreasing rate.

When capacitor 209 is discharged, the voltage across the above described first frequency determining circuit, and therefore the voltage induced on secondary winding 208, is zero. Further, because the current established in the inductance by the discharging capacitor 209 cannot be reduced to zero instantaneously, the polarity of the voltage across the inductance reverses while the energy stored therein is released. Thus, the induced voltage on secondary winding 208 reverses and begins to oppose the flow of base-emitter current through transistor 201 to increasingly reduce the current therethrough.

The current flowing through the primary winding section 204 which can no longer flow through the increasingly nonconductive transistor 201, charges capacitor 209 positive on the bottom as shown in FIG. 1. When the energy stored in inductance of the primary winding section 204 is exhausted, the voltage across the frequency determining circuit and therefore the induced voltage on secondary winding 208 reaches a negative maximum. At this time the conduction of transistor 201 reaches its minimum.

Because, however, the inductor current cannot change further, the capacitor 209 begins to discharge in an attempt to maintain the polarity on the primary winding section 204 positive on the bottom as shown in FIG. 1. As the capacitor becomes discharged, the voltage induced on secondary winding 208 approaches zero and allows an increase in the conduction of transistor 201. In this manner the first frequency determining circuit and transistor 201 are restored to their original electrical conditions and the succeeding oscillation can begin.

It will be noted that during one half-cycle of the above described cycle of oscillation, the current through the capacitor 209 flows one direction and that during the succeeding half cycle of the oscillation the current therethrough flows in the opposite direction. It will be seen that when the timing responsive means is not conducting, that is, when the diode 210 is not conducting with a sufficient DC current level, current through the capacitor 209 is permitted to flow in only one direction, the presence of the nonconducting diode 210 inhibiting oscillation once the capacitor 209 becomes charged positively on the top as shown in FIG. 1.

If, however, the diode 210 is conducting with a substantial DC current level as previously described, the capacitor 209 can discharge through the inductance of the associated primary winding section 204 by reducing the unidirectional current flow downward through diode 210. Thus, when diode 210 conducts, AC circulating currents in the first frequency determining circuit are not inhibited and will continue as long as diode 210 conducts the substantial DC current level to provide a timed, discrete signal of the derived frequency.

From the foregoing it will be seen that as the oscillator circuitry is initially energized, oscillations will begin in all frequency determining circuits but will be inhibited before the completion of a single cycle in those circuits in which the pulse or timing responsive means herein comprising diodes 210, 215, 220 or 225 are nonconducting. Thereafter a single output frequency will be produced and the frequency thereof will be determined by the parameters of the frequency determining circuit which contains a diode 210, 215, 220 or 225 conducting with a substantial DC current level.

It will further be seen that if DC current levels are successively and recurrently established in the diodes 210, 215, 220 and 225, the frequency output of the multifrequency generating section 200 will generate a recurrent succession of discrete, different frequencies the order of which is determined by the order in which the latter named diodes are rendered conducting, it being understood that the capacitance of the respective capacitors and the inductance of the respective primary winding sections fix the respective, discrete frequencies.

The manner in which each discrete frequency signal is maintained at uniform peak amplitude will now be discussed. When the first frequency determining circuit is operative, the inductance of primary winding 204 and capacitor 209 determine the oscillation frequency. However, by autotransformer action the entire primary winding 203*a* induces a feedback signal on secondary winding 208. Similarly, when the second, third and fourth frequency determining circuits are operative, the inductance of the respective groups of primary winding sections and capacitors determine the respective frequencies. However, again, by autotransformer action the entire primary winding in each case induces a feedback signal on secondary winding 208. Consequently, given substantially similar losses in each frequency determining circuit, the peak feedback signal current available to transistor 201 is the same regardless of the frequency being produced. Since the extreme high and low values of the feedback signal currents are the same regardless of the frequency, it is apparent that the extreme high and low values of the voltage across transistor 201 are the same regardless of frequency. Additionally, since the amount of distortion introduced by a nonlinear device such as transistor 201 is dependent upon the amount of drive current supplied thereto, it is apparent that the amount of distortion present in the ultimate output is substantially the same regardless of the frequency then being produced.

While the foregoing discussion of the structure and operation of the different frequency determining circuits is technically correct, it is not the only way in which the operation of the frequency determining circuits may be explained. An equally correct and somewhat more general view is that each of the frequency determining circuits utilizes, for frequency determining purposes, the inductance of the entire primary winding 203*a*. In this respect each of the different capacitors, while being physically connected across predetermined sections of the primary windings, affects the operation of the entire primary winding. This occurs by autotransformer action making it appear as though a different, smaller capacitor were connected across the entire primary winding. The size of this equivalent capacitor is determined by the number of turns in the entire primary in relation to the number of turns in the sections across which the capacitor is physically connected. This smaller capacitance is known as the capacitance referred or reflected to the entire primary. A further aspect of this concept is that since the entire primary winding is, with one or the other of the "capacitor," equally active in determining the frequency, the amount of the feedback voltage induced by primary winding 203*a* on secondary winding is the same regardless of the frequency then being produced.

If a final output signal of higher power content is required, an output amplifier may be provided. An exemplary amplifier for this purpose is shown in FIG. 2 and includes a signal output conductor 228 which joins oscillator output junction 228*a* to the base of a suitable amplifier transistor 229. Full DC supply voltage may be supplied to the power path of transistor 229 by a conductor 230. An emitter-load resistor 231 develops the final output voltage across the output junctions 232 and 233.

As described previously, the establishment of successive and recurrent DC current levels, in timing responsive diodes 210, 215, 220 and 225 will result in the successive and recurrent operation of the different frequency determining circuits, and the successive and recurrent appearance of discrete, different output voltage frequencies at the output of the multifrequency generator. It will be understood that any sequential switching arrangement such as a ring counter, capable of producing the required conduction sequence will suffice to practice the invention. In the embodiment of FIGS. 1 and 2 this sequential switching means is shown as a timing translating section 300A and a pulse generating section 300B. Together, these networks establish the desired periodicity of discrete signals when voltage is applied across the input terminals of the multifrequency generator.

Referring to the timing translating section 300A of FIG. 1, there is shown a plurality of timing translating means each including a switch or pulse pattern responsive means and a plurality of gating means. In the present embodiment the switch means comprises NPN transistors 301, 302, 303 and 304 and the gating means comprise diodes 313 through 320. The collectors of the latter transistors are connected in DC current level establishing relationship to diodes 210, 215, 220 and 225 through the respective current limiting resistors 305, 306, 307 and 308. Base-emitter drive current for each of the above named transistors is applied from the positive supply conductor 114 through the respective resistors 309, 310, 311 and 312. The collector-emitter paths through these transistors are completed to ground through conductor 113 and junction 101*a*.

Figure 3:
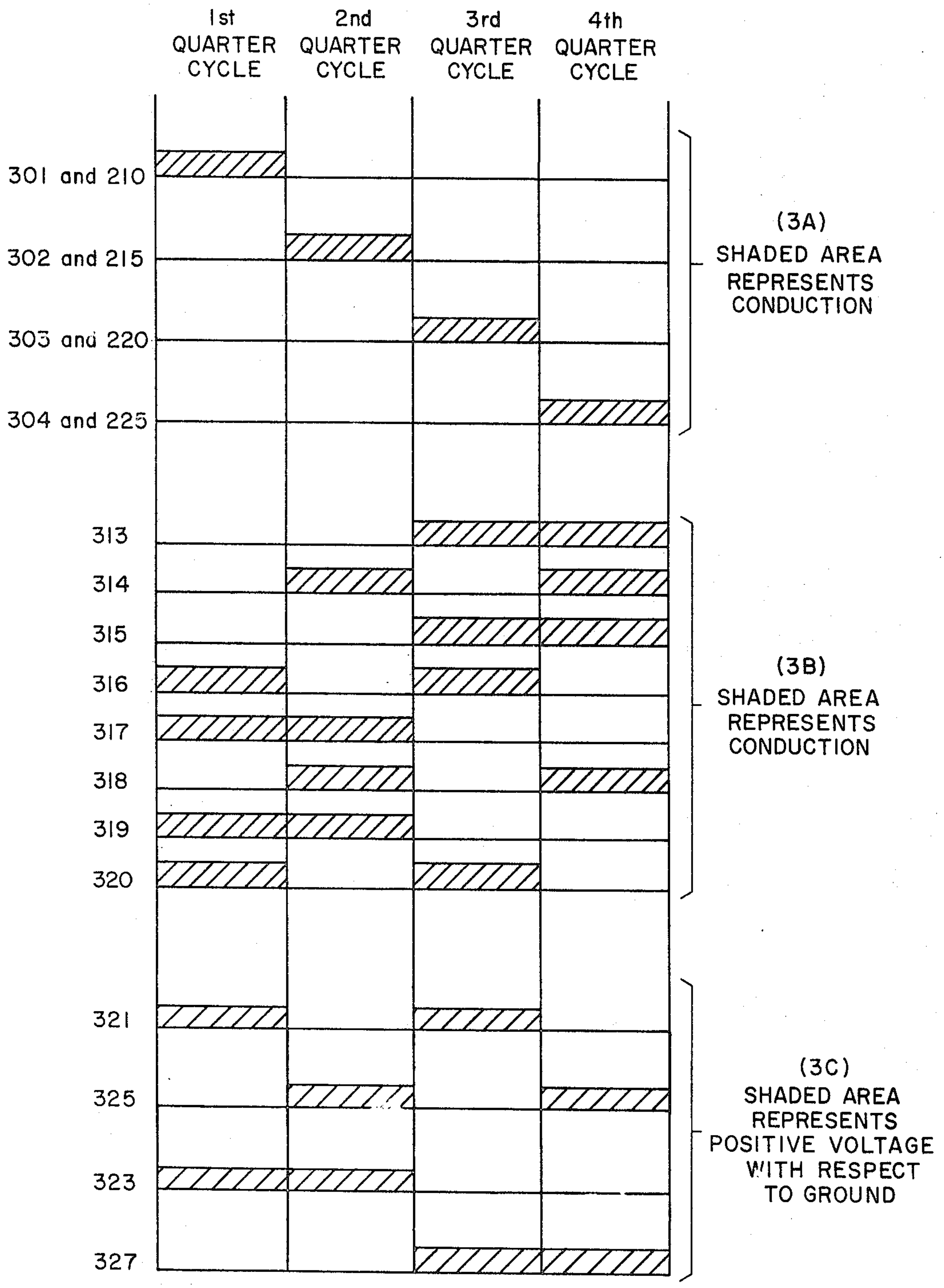
FIG. 3 including sections 3A, 3B and 3C is a timing chart showing the outputs of the various network of FIGS. 1 and 2 together with component conditions.

A single period of operation of the first frequency determining circuit including diode 210 will now be described. This period is the first quarter of the frequency generating cycle in FIG. 3. The anodes of gating diodes 313 and 314 are connected to the base of transistor 301. Because pulse generator 300B controls the connections of the cathodes of diodes 313 and 314 to conductor 112 which is at a potential less than that of conductor 113 when either or both of the diodes 313 or 314 are conducting the potential of the base of transistor 301 is caused to drop to or below the potential of the emitter thereof thereby rendering transistor 301 nonconducting. When, however, both diodes 313 and 314 are nonconducting, the potential of the base of transistor 301 rises thus allowing a base-emitter current to flow from positive conductor 114 through resistor 309, the base-emitter path of transistor 301 and continuing to ground through conductor 113 and junction 101*a* which turns on transistor 301. As a result of the collector-emitter current through transistor 301, the timing responsive diode 210 is energized to permit frequency generating activity to exist in the circuit including primary winding section 204 and capacitor 209. This activity continues throughout the first quarter cycle as shown in FIG. 3, section 3A to be more fully described presently.

In a like manner the anodes of diodes 315 and 316 are connected to the base of transistor 302, the anodes of diodes 317 and 318 are connected to the base of transistor 303 and the anodes of diodes 319 and 320 to the base of transistor 304, the functioning relationship of each of the latter diode pairs being the same as described above with respect to diodes 313 and 314.

In view of the foregoing, it will be seen that any of the transistors 301, 302, 303 and 304 will be rendered conducting when both of the diodes of the respective diode pairs connected to the base thereof are nonconducting. Thus the diode pairs connected to the bases of the respective transistors serve as gating means and render the respective transistors conducting when both of cathodes thereof become positive with respect to the anodes thereof.

It is apparent that an appropriate pattern of positive pulses applied to each of the cathodes of the above named gating diodes can cause transistors 301 through 304 to conduct successively, recurrently and severally to produce the desired output at terminals 232 and 233.

Referring to FIG. 3, section 3A of the drawings there are shown the four quarter cycles of an exemplary and desirable recurrent conduction pattern for transistors 301 through 304 in the timing translating section 300A. During the first quarter cycle, the shaded area represents conduction in transistor 301. Similarly, during the second, third, and fourth quarter cycles, the shaded areas represent conduction in transistors 302, 303 and 304 respectively.

FIG. 3, section 3B of the drawings shows the conduction states of diodes 313 through 320 during each of the above mentioned quarter cycles. For example, during the first quarter cycle, the absence of shaded areas for gating diodes 313 and 314 indicate that the latter diodes are nonconducting, and that as a result, transistor 301 is allowed to conduct and energize diode 210 in a manner previously described. During this same quarter cycle all other gating diode pairs have at least one of their number conducting thus keeping transistors 302 through 304 nonconducting. Similarly, during the second, third and fourth quarter cycles it will be seen that transistors 302, 303 and 304 conduct when both diodes of the respective gating diode pairs associated therewith are nonconducting as shown in section 3B of the drawings.

In order to suitably control the conduction of the diode gating pairs, as shown in section 3B, to render the transistors 301 through 304 successively and recurrently conducting, as shown in section 3A, there is provided a pulse generating section 300B.

In the present embodiment the pulse generating section 300B includes a first pulse pattern generating means here shown as an astable multivibrator 329 for establishing a first positive voltage pulse pattern, and a second pulse pattern generating means here shown as a bistable multivibrator 330 triggered by the first named multivibrator, for establishing a second positive voltage pulse pattern. The connection of the outputs of the above named multivibrators to appropriate diode gating pairs, as will be explained presently, establishes the recurrent conduction pattern shown in section 3B.

A conductor 321 connects the cathodes of diodes 314 and 318 to a first astable multivibrator output 322. Similarly, a conductor 323 connects the cathodes of diodes 313 and 315 to a first bistable multivibrator output 324. Second astable and bistable multivibrator outputs, 326 and 328, are respectively connected to the cathodes of the gating diode pairs 316 and 320, and 317 and 319 by the conductors 325 and 327.

Referring to FIG. 3, section 3C of the drawings, there is shown the required recurrent pattern of positive voltage pulses which are impressed on the conductors 321, 323, 325 and 327 to produce the recurrent conduction pattern shown in section 3B of the drawings. The positive voltage pulses will be impressed on the above-named conductors when the respectively associated astable and bistable multivibrator output junctions 322, 324, 326 and 328 alternately and recurrently attain voltages positive with respect to ground in the course of multivibrator switching activity.

For example, during the first quarter cycle positive voltages are present on conductors 321 and 323 as shown by the shaded areas on section 3C. Because of the positive voltage on conductors 321 and 323, it will be seen that respective gating diodes 314 and 318, and 313 and 315 are reverse biased and therefore nonconducting. Since diodes 313 and 314, among the four latter named diodes, are a gating diode pair for transistor 301 and both are reversed biased, the respective transistor is rendered conducting.

During the second quarter cycle section 3C shows the conductors 325 and 323 to be at positive potential with respect to ground rendering nonconducting the respective diodes 316 and 320, and 313 and 315. Since the gating diode pair 315 and 316 of the transistor 302 is included in the four above-mentioned nonconducting diodes, the latter transistor is rendered conducting. Similarly, during the third and fourth quarter cycles the successive attainment of positive potentials by conductor pairs 321 327, and 325 and 327 respectively renders the transistors 303 and 304 successively conducting.

In view of the foregoing, it will be seen that the pulse pattern applied to the cathode of the gating diodes comprises the input to the timing translating section 300A and that the conduction sequence of transistors 301 through 304 is the output thereof. Thus a voltage pulse pattern impressed at the inputs (gating diodes 313 to 320) emerges as a recurrent conduction pattern in the outputs (leads 213, 218, 223 and 227) and thus in the timing responsive means comprising diodes 210, 215, 220 and 225.

Numerous pulse generator circuits known to those skilled in the art can be arranged to establish a voltage pulse pattern identical or similar to that shown in section 3C on the conductors 321, 323, 325 and 327. An exemplary circuit of this kind is shown in FIG. 2, as the pulse generating means 300B.

Referring more specifically to FIG. 2 there is shown in the pulse generating section 300B an astable multivibrator 329 which serves to provide a first positive voltage pulse pattern at its output junctions 322 and 326. The astable multivibrator 329 also serves to trigger the operation of the bistable multivibrator 330, which in turn provides a second positive voltage pulse pattern at its outputs 324 and 328 as shown in section 3C.

To this end there is provided in the astable multivibrator a pair of astable switching transistors 333 and 334 having respective emitter-load resistors 343 and 344. Capacitors 337 and 338 serve to couple the collector of each of the above named transistors to the base of the other. The latter capacitors allow the collector-emitter voltage of each of the transistors to influence the base-emitter voltage of the other.

The collector-emitter and base-emitter currents through transistors 333 and 334 are limited by the resistors 335, 341, 342 and 336. These resistors also act in conjunction with capacitors 337 and 338 to determine the time constants and therefore the switching frequency of astable multivibrator 329. It will be understood that changes in the RC time constants making them longer or making them nonsymmetrical will provide a wide variety in the durations of the various output signal frequencies.

Amplification of the positive voltage at junctions 339 and 340 may be provided by transistors 345 and 346 and their respective current limiting resistors 347 and 348 to produce positive voltage pulses at junctions 322 and 326, and thus on leads 321 and 325.

The voltage with respect to ground of the base of transistor 333 is the sum of the voltages across resistor 344, the collector-emitter voltage of transistor 334 and the voltage across capacitor 338. Similarly, the voltage with respect to ground at the base of transistor 334 is the sum of the voltages across resistor 343, the collector-emitter voltage of transistor 333 and the voltage across capacitor 337.

Assuming that transistor 333 is conducting and that transistor 334 is nonconducting, the portion of the collector-emitter current that flows through capacitor 337 increases the emitter-base voltage of transistor 334 bringing it nearer to turn on. When the latter voltage attains a sufficiently large value, transistor 334 will be turned on and a negative spike applied to the base of transistor 333 through the capacitor 338 will turn the latter transistor off.

As transistor 334 conducts a portion of the collector-emitter current therethrough charges capacitor 338 and increases the emitter-base voltage of nonconducting transistor 333. This increasing voltage eventually causes the transistors to revert to their original condition by initiating conduction in transistor 333. Thus, the transistors 333 and 334 alternately and recurrently conduct as long as voltage is applied to the astable multivibrator 329 and, as a result, positive voltage pulses are applied alternately to conductors 321 and 325.

As the latter transistors alternately conduct, positive voltage pulses alternately and recurrently appear at junctions 339 and 340 to alternately and recurrently cause conduction in amplifier transistors 345 and 346. This alternate conduction in transistors 345 and 346 in turn causes the output junctions 322 and 326 to alternately and recurrently attain substantial positive voltages with respect to ground conductor 111. The switching activity thus maintained fulfills the requirement of section 3C for a positive voltage pulse pattern at the outputs 322 and 326 as will be more fully described presently.

To the end that a second positive voltage pulse pattern may be applied to the timing translator 300A there is provided the bistable multivibrator 330 previously referred to.

This second positive voltage pulse pattern at outputs 324 and 328 is shown in section 3C. For this purpose the latter network includes bistable switching transistors 349 and 350 with their respective current limiting resistors 351 and 352. The respective diodes 353 and 354 complete the collector-emitter paths of transistors 349 and 350 by connecting the emitters of the latter to conductor 112. These diodes insure the nonconduction of the nonconducting transistor.

A voltage divider comprising resistors 355 and 356 applies a portion of the collector voltage of transistor 349 to the base of transistor 350. Similarly, the voltage divider comprising resistors 358 and 359 applies a portion of the collector voltage of transistor 350 to the base of transistor 349.

Triggering networks for the bistable switching transistors 349 and 350 include capacitor 361, resistor 362, junction 363 and diode 364; and capacitor 365, resistor 366, junction 367 and diode 368 respectively. In order that the astable multivibrator 329 may trigger the operation of the bistable multivibrator 330 the leads 325a and 325b join the output junction 326 of the former to a triggering junction 369 of the latter.

Assuming that transistor 349 is conducting and that transistor 350 is nonconducting, there exists a first stable conduction pattern. Because the collector-emitter voltage of a nonconducting transistor 350 is high, a substantial voltage is applied to the base-emitter of conducting transistor 349 holding it on. On the other hand, because the collector-emitter voltage of conducting transistor 349 is low, a negligible voltage is applied to the base-emitter of nonconducting transistor 350 thus maintaining it nonconducting. Under these conditions capacitor 361 is charged positive on the bottom and capacitor 365 is essentially uncharged.

If the junction 369 is, however, suddenly brought to ground potential, as by the conduction of transistor 346, the potentials of the bases of transistors 349 and 350 fall. Because of the initial charge on capacitor 361, the base of the originally conducting transistor 349, falls farther than the base of the originally nonconducting transistor 350. As a result, when the potentials of the bases of transistors 349 and 350 rise as capacitors 361 and 365 charge, the voltage of the originally nonconducting transistor 350 reaches its turn on potential before originally conducting transistor 349. The conduction of transistor 350, acting through resistors 358 and 359, thereafter prevents a turn on potential from appearing on the base potential of transistor 349. Thus a second stable conduction pattern is established which will continue until the conduction of transistor 346 again causes a reversal in the conduction states of transistors 349 and 350 returning them to their original conduction states.

Thus, as the conduction states the transistor 349 and 350 alternate recurrently in response to the recurrent conduction of transistor 346, the positive voltage at the collectors thereof are caused to follow, and the positive voltage pulse pattern at outputs 324 and 328 and thus conductors 323 and 327 as shown in section 3C is established.

Since the order in which the plurality of output frequencies occur in the circuit of FIGS. 1 and 2 has a bearing on the use to which a multifrequency generator my be put, it is desirable that the order of occurrence by predetermined. It may be shown, by analysis of voltage pulse patterns similar to those shown in section 3C, that regardless of which of the possible pairs of transistors 333, 334, 349 and 350 conduct first when the pulse generator section 300B is first energized, for a given arrangement of connections from multivibrator outputs to timing translating inputs, the same recurrent conduction pattern occurs in timing translating transistors 301, 302, 303 and 304, the recurrent sequence merely beginning in a different portion of the same recurring pattern for the different combinations of starting conditions in the transistors 333, 334, 349 and 350.

Figure 4:
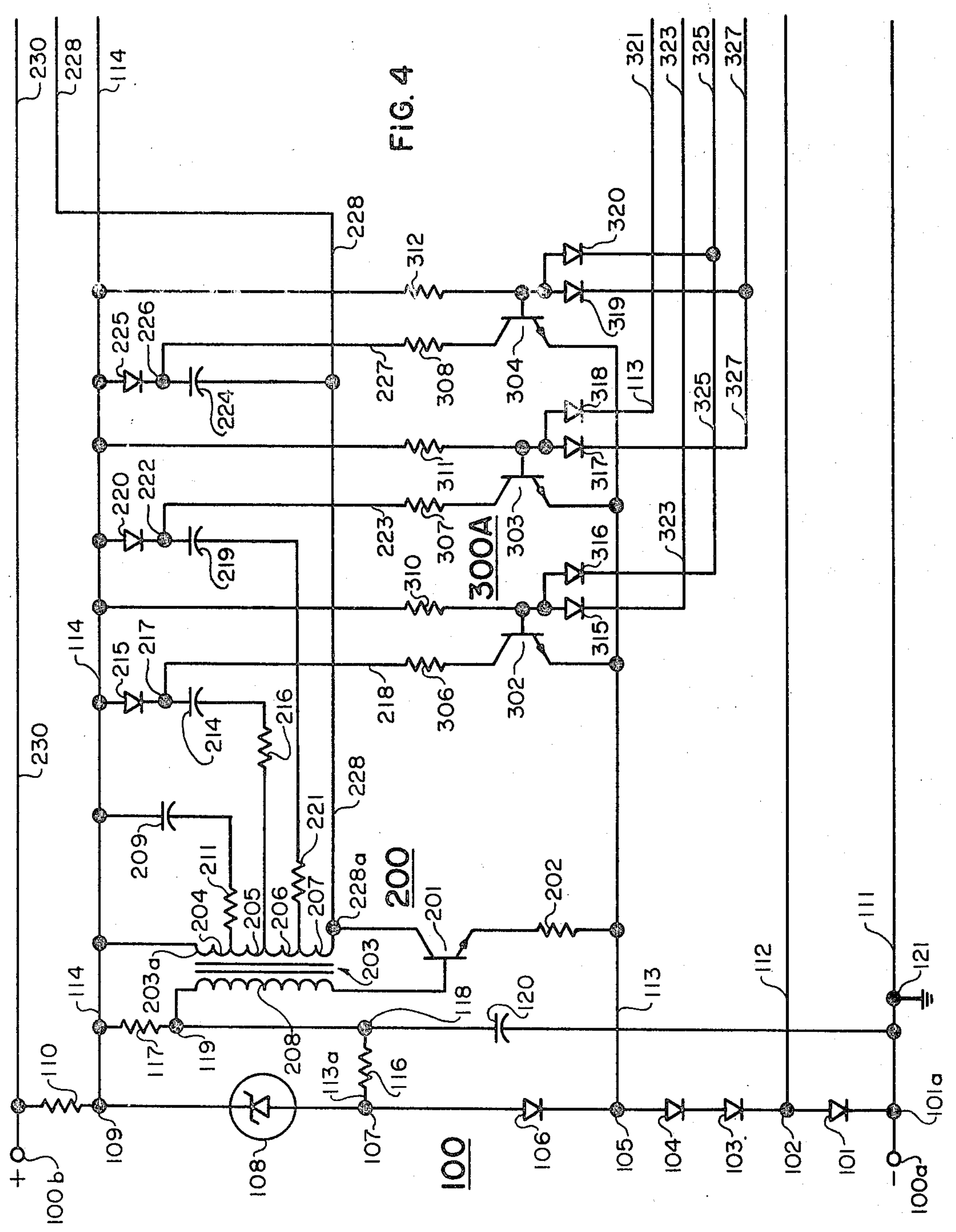

If it is desirable that one of the frequency determining circuits be energized continuously, this may be accomplished by the arrangement shown in FIG. 4. This circuit is similar to that of FIG. 1 and like numerals are therefore applied to like parts.

In the circuit of FIG. 4 the tank circuit including the capacitor 209 is independent of the pulse generating circuitry of FIG. 2 since the respective pulse pattern responsive transistor and gating diodes have been omitted from the circuit.

When the networks including transistors 302, 303 and 304 are in an "off" condition, the tank circuit including capacitor 209 generates a tone at the output of the generator. Then, as these networks are severally and sequentially energized as described in conjunction with FIG. 1, the tank circuit including the capacitor 209 successively and severally coacts in frequency determining relationship with these networks to form the succeeding three tones. This coaction occurs because the capacitors respectively associated with the different energized tank circuits are each reflected across the entire primary winding 203a where their effects are additive, the reflected value of each being determined by the ratio between the respective winding sections and the entire primary winding as described previously.

From the foregoing it will be seen that there is provided, by the present invention, means for supplying a multiplicity of different, discrete frequency signals of constant amplitude and predetermined duration, these signals being generated in a predetermined order of succession and supplied severally to avoid admixture of frequencies at the output. To this end a sequential switching means activates, in predetermined succession, the different timing responsive means each of which is associated with the generation of a particular frequency.

It will be understood that the embodiment shown herein is for explanatory purposes only and may be changed or modified without departing from the spirit and scope of the appended claims.

We claim:

1. In a signal generator for producing a plurality of discrete frequency signals successively in a predetermined periodicity pattern and having an input and an output, in combination, astable pulse generating means for establishing a predetermined periodicity pattern of energizing pulses and including a plurality of outputs, a plurality of frequency determining circuits, a plurality of pulse pattern responsive means, means for electrically connecting each of said pulse pattern responsive means to a respective frequency determining circuit, means for electrically connecting respective pulse pattern responsive means to respective outputs of said pulse generating means in pulse responsive relationship thereby to successively energize predetermined ones of said frequency determining circuits in accordance with the periodicity pattern of the pulses from said pulse generating means and means for electrically connecting said frequency determining circuits to the output of said signal generator.

2. In a signal generator for producing a predetermined periodicity pattern of discrete output frequencies having a DC power input and a signal output, in combination, an oscillator circuit including a plurality of frequency determining means, means for connecting said oscillator circuit to the DC power input, said oscillator circuit being adapted to produce an output frequency when circulating currents of said output frequency flow in a respective frequency determining means, timing responsive means, means for connecting said timing responsive means in energizing and deenergizing relationship to predetermined ones of said frequency determining means to establish circulating currents in respective frequency determining means when said timing responsive means is energized, astable switching means for successively energizing said timing responsive means in a predetermined periodicity, means for connecting said astable switching means to said timing responsive means and means for connecting said frequency determining means in signal transmitting relationship to said output.

3. In a signal frequency generator for generating a plurality of different, discrete frequency signals in a predetermined sequence, said generator having a DC power input and an AC output, in combination, a plurality of frequency determining circuit sections, unidirectional conducting means in predetermined ones of said frequency determining circuit sections to control the conduction in the respective frequency determining circuit section, pulse pattern responsive means, gating means, means for electrically connecting each of said unidirectional conducting means to a respective pulse pattern responsive means, means for electrically connecting said gating means to respective pulse pattern responsive means to render said respective pulse pattern responsive means conducting when said respective gating means is rendered nonconducting, astable pulse generating means having a plurality of output terminals, means for electrically connecting said output terminals of said pulse generating means to respective gating means to render said gating means nonconducting in a predetermined pattern in response to pulses supplied by said pulse generating means.

4. In a signal generator for producing a plurality of different, discrete frequency signals in a predetermined sequence, said generator having a DC power input provided with a plurality of terminals and an AC output, in combination, inductive feedback means including an exciting winding and a feedback winding, variable conducting means including a power circuit and a control circuit, means for connecting said exciting winding and the power circuit of said variable conducting means in series circuit relationship across different terminals of the DC power input, means for connecting said feedback winding in closed circuit, oscillation sustaining relationship with the control circuit of said variable conducting means, taps on one of said windings for defining a plurality of winding sections, a plurality of capacitive means, means for connecting a first capacitive means across a first predetermined winding section, a plurality of timing responsive means, means for connecting the remaining capacitive means across other predetermined winding sections through respective timing responsive means, astable switching means having an input and a plurality of outputs, means for connecting the input of said astable switching means to the DC power input, means for connecting the outputs of said astable switching means to respective timing responsive means to energize said timing responsive means and thereby determine the oscillation frequency of the signal generator.

5. A signal generator for producing, in sequence, a plurality of discrete signal frequencies and comprising, in combination, frequency determining means including inductance means and a plurality of capacitors, switching means for at least one of said capacitors, said switching means comprising a diode in series with said capacitor and means for passing direct current through said diode to effectively close the circuit between said capacitor and said inductance means, and astable means for periodically actuating said switching means to provide, in sequence, said plurality of discrete frequencies.

6. A signal generator as set forth in claim 5 in which the amplitude of each signal frequency is determined by a resistor associated with at least one of said capacitors.

7. A signal generator as claimed in claim 5 in which said switching means comprises a transistor having its collector connected to said diode and its base-emitter circuit actuated from a timing means.

8. In a signal generator for producing a plurality of discrete frequency signals successively in a predetermined periodicity pattern, in combination, a DC source, astable switching means for establishing a predetermined, recurring pattern of conduction through a plurality of outputs thereof, means for connecting said switching means to said DC source, an oscillator, means for connecting said oscillator to said DC source, said oscillator including frequency determining circuit means comprising an inductor having a plurality of taps and a plurality of capacitors, a plurality of unidirectional conducting means, means for connecting said unidirectional conducting means between one terminal of said DC source and one terminal of respective capacitors, means for connecting the remaining terminals of said capacitors to respective taps of said tapped inductor, means for connecting the outputs of said astable switching means in DC current level establishing relationship to respective ones of said unidirectional conducting means and means for connecting said oscillator to the output of said signal generator.

9. A signal generator as set forth in claim 8 wherein said astable switching means includes a plurality of multivibrators each having a pair of output terminals, a plurality of gates, means for connecting said multivibrator output terminals to predetermined respective gates to establish a recurrent pattern of conduction therein and means for connecting said gates to respective outputs of said astable switching means.

10. In a signal generator for producing a plurality of discrete frequency signals successively in a predetermined periodicity pattern, in combination, a DC source, an oscillator, means for connecting said DC source in energizing relationship to said oscillator, said oscillator including a tapped inductor and a plurality of capacitors, means for connecting said capacitors between one end of said tapped inductor and respective taps thereof to establish a plurality of tank circuits, predetermined ones of said last named connecting means including a diode, a plurality of semiconductor switches, means for connecting said switches in series, DC current level establishing relationship to respective diodes, astable switching means for alternately and severally energizing said semiconductor switches, means for connecting said switching means to said DC source and means for connecting said oscillator to the output of said signal generator.

11. A signal generator as set forth in claim 10 including a plurality of resistors for equalizing the peak amplitudes of the oscillatory voltages produced during the utilization of different ones of said tank circuits and means for connecting said resistors in series with predetermined ones of said capacitors.

UNITED STATES PATENT OFFICE
CERTIFICATE OF CORRECTION

Patent No. 3,573,663 Dated April 6, 1971

Inventor(s) Henry M. Huge and Benny K. Barnes

It is certified that error appears in the above-identified patent and that said Letters Patent are hereby corrected as shown below:

Column 2, line 69, change "113a" to --diode--.

Column 3, line 24, change "LS" to --LC--.

Signed and sealed this 10th day of August 1971.

(SEAL)
Attest:

EDWARD M.FLETCHER,JR.
Attesting Officer

WILLIAM E. SCHUYLER, JR.
Commissioner of Patents